US009709999B2

(12) United States Patent
Roman et al.

(10) Patent No.: US 9,709,999 B2
(45) Date of Patent: Jul. 18, 2017

(54) THERMOSTATIC ELEMENT

(71) Applicant: VERNET, Ollainville (FR)

(72) Inventors: Jean-Michel Roman, Perthes en Gatinais (FR); Guillaume Gautier Graindorge, Montigny le Bretonneux (FR)

(73) Assignee: VERNET, Ollainville (FR)

( * ) Notice: Subject to any disclaimer, the term of this patent is extended or adjusted under 35 U.S.C. 154(b) by 346 days.

(21) Appl. No.: 14/403,142

(22) PCT Filed: May 22, 2013

(86) PCT No.: PCT/EP2013/060533
§ 371 (c)(1),
(2) Date: Nov. 21, 2014

(87) PCT Pub. No.: WO2013/174875
PCT Pub. Date: Nov. 28, 2013

(65) Prior Publication Data
US 2015/0083814 A1 Mar. 26, 2015

(30) Foreign Application Priority Data

May 23, 2012 (FR) ...................................... 12 54724

(51) Int. Cl.
*G05D 23/185* (2006.01)
*F03G 7/06* (2006.01)
(Continued)

(52) U.S. Cl.
CPC ........... *G05D 23/1852* (2013.01); *F03G 7/06* (2013.01); *G01K 5/44* (2013.01); *G05D 23/022* (2013.01); *G05D 23/025* (2013.01)

(58) Field of Classification Search
CPC .......... G01K 5/44; G05D 23/01; G05D 23/02; G05D 23/021; G05D 23/022; G05D 23/024; G05D 23/025; G05D 23/1852
See application file for complete search history.

(56) References Cited

U.S. PATENT DOCUMENTS 3,153,933 A * 10/1964 Freismuth ................ G01K 5/44
236/DIG. 5
4,337,621 A * 7/1982 Lane, Jr. ............... G05D 23/021
236/100

(Continued)

FOREIGN PATENT DOCUMENTS

DE       101 04 690 A1   8/2002
DE   20 2006 001145 U1   6/2007
(Continued)

*Primary Examiner* — Jonathan Bradford
(74) *Attorney, Agent, or Firm* — Knobbe, Martens, Olson & Bear, LLP

(57) ABSTRACT

An element with a cup containing a thermally expanding material, a piston capable of translational movement along its axis, a rigid guide for guiding the piston, a seal for sealing in the thermally expanding material having an annular overall shape, centered on the axis and through which the piston passes axially, and which includes first and second opposite axial parts against which the guide and cup press respectively in an antagonistic manner to compress the seal around the piston, and an anti-extrusion washer mounted coaxially around the piston and axially interposed between the guide and first part of the seal. The first part of the seal around the piston can be supercompressed to make the degree of compression equal to a value strictly higher than that associated with an operational thermostatic element formed by the cup, piston, guide, seal and anti-extrusion washer assembled with one another without the supercompression.

20 Claims, 8 Drawing Sheets

(51) Int. Cl.
  *G01K 5/44*     (2006.01)
  *G05D 23/02*    (2006.01)

(56) References Cited

U.S. PATENT DOCUMENTS

| | | | | |
|---|---|---|---|---|
| 5,177,963 | A * | 1/1993 | Kuze | G05D 23/021 |
| | | | | 374/160 |
| 5,381,951 | A * | 1/1995 | Michel | F01P 11/16 |
| | | | | 236/34.5 |
| 5,509,269 | A * | 4/1996 | Kuze | G05D 23/02 |
| | | | | 60/527 |
| 7,175,102 | B2 * | 2/2007 | Inoue | G05D 23/021 |
| | | | | 236/100 |
| 7,469,841 | B1 * | 12/2008 | Lamb | F03G 7/06 |
| | | | | 236/100 |
| 8,550,371 | B2 * | 10/2013 | Bouloy | F16K 31/002 |
| | | | | 236/100 |
| 2012/0097750 | A1 | 4/2012 | Kusakabe | |

FOREIGN PATENT DOCUMENTS

| | | |
|---|---|---|
| DE | 10 2009 024 263 A1 | 12/2010 |
| EP | 0 940 577 A2 | 9/1999 |

\* cited by examiner

THERMOSTATIC ELEMENT

FIELD OF THE INVENTION

The present invention relates to a thermostatic element, i.e., an element which, by using a thermally expanding material, converts heat energy into mechanical energy.

BACKGROUND OF THE INVENTION

Such elements are commonly used in the field of fluid regulation, since they make it possible to divide a fluid supply path into one or more distribution paths, depending on the heat of the fluid to be regulated and/or other heat sources. These elements are for example arranged within cooling circuits in which a cooling fluid circulates, in particular cooling circuits for motor vehicle heat engines or similar. Of course, other application examples can be considered, such as motor oil and gearbox circuits, as well as domestic supply water circuits.

Typically, a thermostatic element includes a metal cup with a generally tubular shape and containing a thermally expanding material such as a wax. The element also includes a piston coaxial to the cup and translatable relative to said cup under the effect of the expansion of the thermally expanding material contained in the cup, when that material is heated. In expanding, thermally expanding material partially drives the piston, such that the latter is deployed outside the cup whereas, during cooling of the thermally expanding material, the piston can be retracted inside the cup, generally under the action of a return spring associated with the thermostatic element. To guide the translational movements of the piston, the thermostatic element includes a bored metal guide, inside which the piston slides, that guide thus constituting a guide part that is firmly secured to the cup. Furthermore, to prevent the thermally expanding material from escaping outside the cup during movements of the piston and, at the same time, a liquid outside the thermostatic element, typically in which that thermostatic element is bathed, from being able to infiltrate along the piston up to the end of the piston submerged in the cup, it is known to seal the thermally expanding material relative to the outside using a flexible part whereof a tubular part is arranged coaxially around the piston. Traditionally, two main families of thermostatic elements are distinguished based on the extent of the covering of the piston by the flexible part. More precisely, when the flexible part forms a blind thimble, i.e., a sack delimiting a non-emerging cavity, the piston is received therein without establishing direct contact with the thermally expanding material: during an expansion of that material, it applies pressure forces on the sack, which then becomes pinched such that the piston is ejected therefrom, producing the translational movement. Conversely, when the flexible part is axially passed all the way through by the piston and is thus similar to a globally annular seal, centered on the axis of translation of the piston, the piston plunges directly into the thermally expanding material and is subject, without any intermediary, to the pressure applied by the material when it is heated, as illustrated by EP-A-0,940,577.

The invention specifically relates to thermostatic elements that incorporate such an annular seal and in which opposite axial parts of that annular seal are subject to pressing bearing, which is substantially antagonistic, by the guide and the cup, respectively, so as to compress the seal around the piston and thereby seal the cylindrical interface between the seal, which remains stationary relative to the guide and the cup compressing it, and the sliding piston.

During use, this sealing gasket is subject to high pressures coming from the thermally expanding material, which tend to extrude the flexible material making up the seal outside the thermostatic element, by forcing the flexible material to pass between the piston and the central bore of the guide. It is therefore known to interpose, axially between the seal and the guide, an anti-extrusion washer that is mounted coaxially around the piston.

Over the course of the usage cycles of the thermostatic element, it is observed that the flexible material making up the sealing gasket tends to wear and have permanent deformations, which gradually decreases the contact pressure between the seal and the piston, until the pressure becomes insufficient to guarantee sufficient sealing with respect to the outside of the thermostatic element. Independently of the aforementioned wear phenomenon, a critical situation may also occur when the thermostatic element is subject to a rapid and/or significant decrease in temperature, while bathing in a liquid under high pressure: under these severe usage conditions, the aforementioned liquid quite often succeeds in infiltrating along the piston, due to the accumulation of an abrupt retraction of the piston and the cup and the high pressure of the liquid. To avoid these drawbacks, it is known to attach a flexible packing, forming a sealing bellows, that is fastened to the piston and the guide, while covering the outlet thereof to the outside. That being the case, the placement of such a packing remains complex operation that is therefore expensive to implement. Furthermore, other solutions to prevent an outside liquid from being able to infiltrate the thermostatic element along the piston have been proposed in the past, but like the solution consisting of the aforementioned packing, they systematically cause an excess product cost and a non-negligible excess process cost.

SUMMARY OF THE INVENTION

The aim of the present invention is to propose an improved thermostatic element, the sealing of which with respect to the outside is reinforced simply, reliably and cost-effectively.

To that end, the invention relates to a thermostatic element including:

a rigid cup, which contains a thermally expandable material, a rigid piston, which is translatable, along its axis, relative to the cup, under the action of the thermally expandable material during an expansion of that material, a rigid guide for guiding the translation of the piston, said guide being rigidly secured to the cup, a flexible seal for sealing the thermally expandable material with respect to the outside of the thermostatic element, said flexible seal having a globally annular shape that is centered on the axis and that is axially crossed all the way through by the piston, said flexible seal including first and second opposite axial parts, against which the guide and the cup are respectively pressed substantially antagonistically so as to compress the seal around the piston, and an anti-extrusion washer, which is mounted coaxially around the piston and is axially interposed between the guide and the first part of the seal, wherein a raised portion protruding from a surface of the guide is pressed against the first part of the seal so as to over-compress the first part of the seal around the piston, the raised portion being suitable for making the compression rate of the first part of the seal equal to a value strictly greater than its value associated with an operational thermostatic element formed by the cup, the piston, the guide, the seal and the anti-extrusion washer assembled to each other without the raised portion.

The invention relates also to another thermostatic element, including:

a rigid cup, which contains a thermally expandable material, a rigid piston, which is translatable, along its axis, relative to the cup, under the action of the thermally expandable material during an expansion of that material, a rigid guide for guiding the translation of the piston, said guide being rigidly secured to the cup, a flexible seal for sealing the thermally expandable material with respect to the outside of the thermostatic element, said flexible seal having a globally annular shape that is centered on the axis and that is axially crossed all the way through by the piston, said flexible seal including first and second opposite axial parts, against which the guide and the cup are respectively pressed substantially antagonistically so as to compress the seal around the piston, an anti-extrusion washer, which is mounted coaxially around the piston and is axially interposed between the guide and the first part of the seal, and at least one additional washer in addition to the anti-extrusion washer, which is mounted coaxially around the piston and which is axially interposed either between the guide and the anti-extrusion washer, or between the anti-extrusion washer and the first part of the seal, so as to over-compress the first part of the seal around the piston, said at least one additional washer being suitable for making the compression rate of the first part of the seal equal to a value strictly greater than its value associated with an operational thermostatic element formed by the cup, the piston, the guide, the seal and the anti-extrusion washer assembled to each other without the at least one additional washer.

The invention relates also to yet another thermostatic element, including:

a rigid cup, which contains a thermally expandable material, a rigid piston, which is translatable, along its axis, relative to the cup, under the action of the thermally expandable material during an expansion of that material, a rigid guide for guiding the translation of the piston, said guide being rigidly secured to the cup, a flexible seal for sealing the thermally expandable material with respect to the outside of the thermostatic element, said flexible seal having a globally annular shape that is centered on the axis and that is axially crossed all the way through by the piston, said flexible seal including first and second opposite axial parts, against which the guide and the cup are respectively pressed substantially antagonistically so as to compress the seal around the piston, and an anti-extrusion washer, which is mounted coaxially around the piston and is axially interposed between the guide and the first part of the seal, wherein a bead, which is provided radially protruding inward from the wall of a through hole, centered on the axis and delimited by the seal to receive the piston, and canceled out by radial crushing when the piston is received in the through hole in the assembled state of the thermostatic element so as to over-compress the first part of the seal around the piston, the bead being suitable for making the compression rate of the first part of the seal equal to a value strictly greater than its value associated with an operational thermostatic element formed by the cup, the piston, the guide, the seal and the anti-extrusion washer assembled to each other without the bead.

One of the ideas at the base of the invention is to seek further tightening around the piston, specifically the part of the seal turned toward the guide, while only marginally modifying the overall pre-existing structure of the thermostatic element and thus not causing a significant excess cost regarding the parts making up the thermostatic element and the assembly of those parts. Thus, the thermostatic element according to the invention copies all of the preexisting parts in a thermostatic element of the prior art and additionally incorporates mechanical means that are specific to the invention and that include the above defined bead, additional washer(s) and/or the raised portion: the aforementioned parts can be assembled to each other, without incorporating the aforementioned specific means, so as to form a thermostatic element of the prior art that is operational, i.e., that can be used in a satisfactory manner, but with limited sealing performance levels of its seal with respect to the outside, as explained above. The aforementioned specific means are, in a way, added to the pre-existing and self-sufficient parts, so as to increase the crushing of the first part of the seal, i.e., the part turned toward the guide, within the thermostatic element according to the invention in the assembled state: more specifically, the means specific to the invention are designed to increase the compression rate of the flexible material making up the first part of the seal, which amounts to saying that in the presence of the aforementioned specific means, the material making up the first part of the seal is forced to occupy a smaller volume than that occupied by the material of the first part in the absence of said specific means and/or that, in the presence of the aforementioned specific means, the first part of the seal is forced to occupy the same volume, but includes more material than that first part in the absence of those specific means. The contact pressure between the first part of the seal and the piston is increased as a result, which locally reinforces and/or extends the sealing over time with respect to a liquid outside the thermostatic element, without significantly altering the cooperation between the rest of the seal and the piston. In particular, the reinforced sealing at this first part of the seal is such that the latter performs a real anti-absorption function of liquid under severe usage conditions, in particular in case of abrupt retraction of the piston into the cup, related to a rapid and/or significant decrease in temperature, whereas the thermostatic element is in a high-pressure liquid medium. As explained in more detail below, the invention provides that the implementation of the aforementioned specific means may relate to the guide and/or the anti-extrusion washer and/or the first part of the sealing gasket.

BRIEF DESCRIPTION OF THE DRAWINGS

The invention will be better understood upon reading the following description, provided solely as an example and done in reference to the drawings, in which.

DETAILED DESCRIPTION OF PREFERRED EMBODIMENTS

Figure 1:
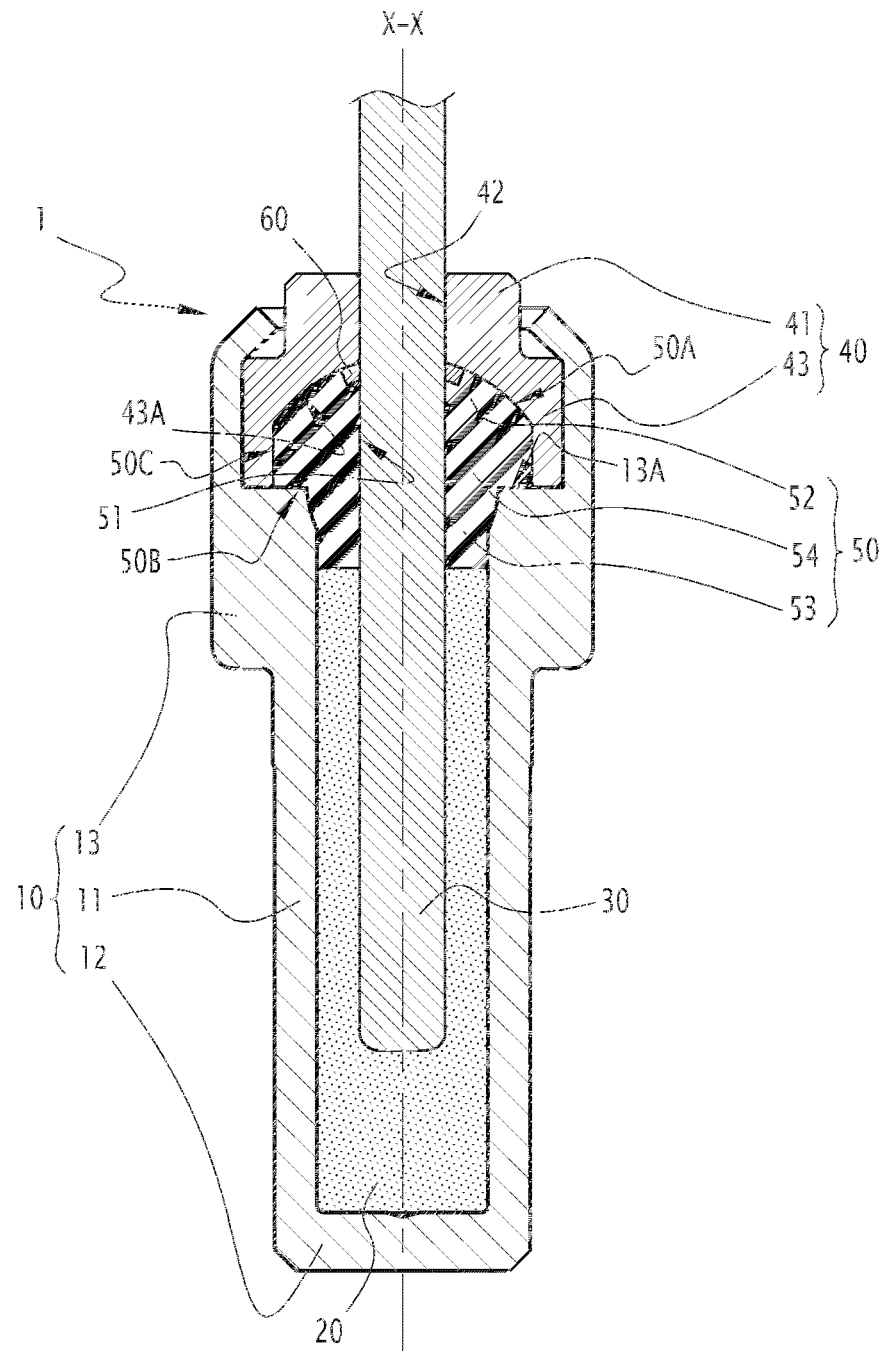
FIG. 1 is a longitudinal cross-section of a thermostatic element of the prior art.
Figure 2:
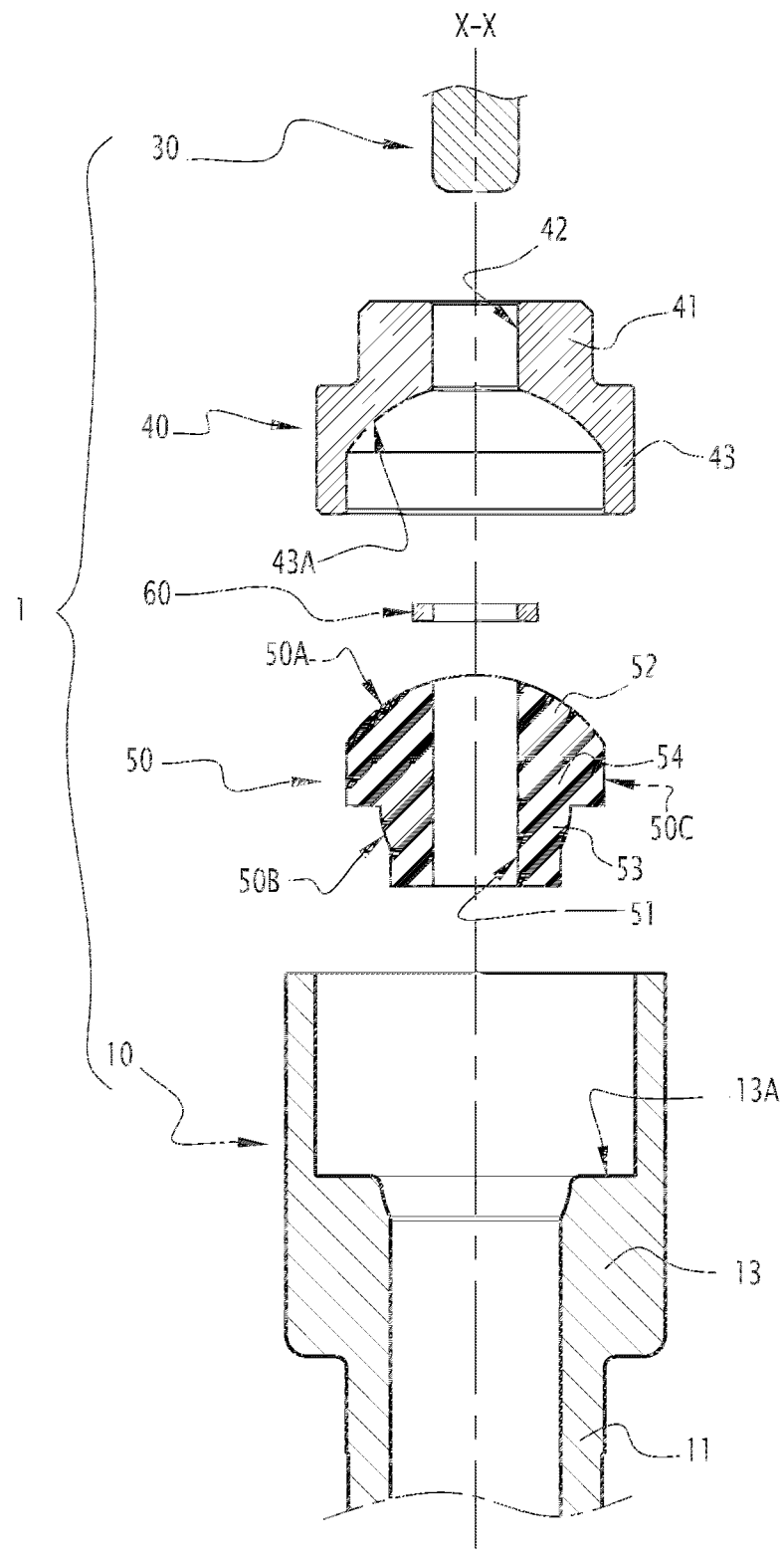
FIG. 2 is an exploded view of part of the thermostatic element of FIG. 1.

FIGS. 1 and 2 show a thermostatic element 1 including a rigid cup 10 typically made from a metal alloy that conducts heat well, for example brass. This cup 10 has a globally tubular shape, centered on an axis X-X. In the example embodiment considered in the figures, the cup 10 includes a main barrel 11 with a cylindrical shape, with a circular base centered on the axis X-X. This barrel 11 is closed at one of its axial ends by a bottom wall 12. In this way, the cup 10 contains a thermally expandable material 20 stored inside the barrel, that thermally expandable material for example being made up of a wax, optionally filled with a powder having good heat conductivity, for example a copper powder.

For convenience, the rest of the description is oriented considering that the terms "lower" and "bottom" designate a direction extending along the axis X-X and oriented toward the bottom wall 12, in other words toward the bottom part of the figures, while the terms "upper" and "top" designate an opposite direction.

The thermostatic element 1 includes a piston 30 arranged coaxially to the cup 10. The lower end part of that piston 30 is housed inside the barrel 11 to undergo the action therein of the thermally expandable material when that material expands after heating. Through the developments described below, the variation of the volume of the heated thermally expandable material causes an upward translational movement of the piston 30 along the axis X-X relative to the cup 10.

The translational movement of the piston 30 is guided by a rigid part forming a guide 40 belonging to the thermostatic element 1. This guide is in particular made from metal, like the piston 30. The guide 40 includes a bored upper plate 41, which extends globally in a plane perpendicular to the axis X-X and whereof the central bore 42 is centered on that axis. In cross-section transverse to the axis X-X, the bore 42 has a profile substantially adjusted on the outer profile of the piston 30, such that the piston is axially received and guided in the bore 42. The guide 40 also includes a globally tubular lower collar 43, which is centered on the axis X-X and extends axially protruding downward from the plate 41. Outwardly, this collar 43 is adapted to be rigidly secured, in particular by crimping, to a collar 13 of the cup 10, provided at the upper end of the barrel 11, FIG. 2 illustrating the assembled state of the thermostatic element 1 with the cup and the guide assembled to one another by crimping of the collar 13 on the collar 43.

In order to seal the thermally expandable material 20 with respect to the outside of the cup 10, in particular in order to limit, or even prevent a liquid, typically in which the thermostatic element 1 is bathed during use, from being able to infiltrate downwardly along the piston 30, the thermostatic element 1 includes a sealing gasket 50 that is made from a flexible material, in particular either natural or synthetic rubber, i.e., elastomer. This seal 50 has an annular overall shape, centered on the axis X-X. Thus, the seal 50 delimits a through hole 51, which crosses axially all the way through the seal, connecting its upper end surface 50A, which is turned toward the guide 40, and its lower end surface 50A, which is turned toward the thermally expandable material 20 contained in the cup 10, to each other.

In the assembled state of the thermostatic element 1, the piston 30 is received coaxially in the through hole 51, while extending axially both on either side of the seal 50, protruding axially upward from the surface 50A and protruding axially downward from the surface 50B, and the inside of the seal 50, between the surfaces 50A and 50B thereof. The seal 50 is mounted gripped around the piston 30, i.e., mounted compressed around the longitudinal part of the piston, extending between the surfaces 50A and 50B. To that end, in the assembled state of the thermostatic element 1, in particular under the effect of the rigid securing between the cup 10 and the guide 40, at least part of the upper end face 50A of the seal 50 is pressed downward by a bearing face 43A, which is delimited by the guide 40 inside the collar 43 and on which the bore 42 emerges downward, whereas, substantially antagonistically, at least part of the lower end surface 50B of the seal 50 is pressed upward by a bearing surface 13A, which is delimited by the cup 10 inside the collar 13 and on which the barrel 11 emerges upward, thus, by downward bearing of the bearing surface 43A against an upper terminal part 52 of the seal 50 and by antagonistic upward bearing of the bearing surface 13A against a bottom terminal part 53 of the seal 50, the seal is compressed, with the result that its through hole 51 tends to contract radially inward, which results in radially gripping the seal 50 all around the piston 30 in light of the presence of a longitudinal part of the latter between the opposite surfaces 50A and 50B of the seal. It will be noted that this compression of the seal 50, making it possible to compress the latter around the piston 30, relates to both the upper 52 and lower 53 parts, as well as an intermediate part 54 of the seal 50, which, in the embodiment considered in FIGS. 1 and 2 as an example, axially connects the upper 52 and lower 53 parts to each other: thus, in this example embodiment, the seal 50 is made up of the parts 52, 53 and 54, with the result that on the one hand, the through hole 51 extends successively, along the axis X-X, through the parts 52, 54 and 53 and, on the other hand, the upper 50A and lower 50B end surfaces are respectively delimited by the top 52 and bottom 53 parts, while the intermediate part 54 outwardly delimits a peripheral side surface 50C of the seal 50, which is cylindrical and centered on the axis X-X, and which, in the assembled state of the thermostatic element 1, is received in an adjusted manner in the downward opening of the collar 43.

Advantageously, in particular for reasons related to distribution of the bearing stresses pressing the guide 40 on the seal 50, the bearing surface 43A is at least partially, or even completely, as in the example embodiment considered in FIGS. 1 and 2, made in the form of a sphere portion, allowing the axis X-X as the geometric axis of revolution. For its part, the bearing surface 13A delimited by the cup 10 advantageously includes, as in the example embodiment considered in the figures, both a planar surface, which fits into a geometric plane substantially perpendicular to the axis X-X, in particular for axial positioning purposes of the seal 50 during the assembly of the thermostatic element 1, and a flared element, which connects, while becoming gradually narrower toward the bottom, the aforementioned planar surface to the inner wall of the barrel 11, in particular for centering purposes on the axis X-X of the seal 50 during the assembly of the thermostatic element.

In order to prevent the extrusion of the flexible material making up the seal 50 outside the thermostatic element 1 via the bore 42 of the guide 40, the thermostatic element 1 further includes an anti-extrusion washer 60, which is mounted coaxially around the piston 30 and which is axially interposed between the guide 40 and the upper part 52 of the seal 50. In the assembled state of the thermostatic element, this washer 60 is upwardly curved, while hugging the perimeter of the downward opening of the bore 42.

In practice, this washer 60 has a rigidity greater than that of the seal 50, but lower than that of the guide 40 and the piston 30. Thus, in the event the piston 30 and the guide 40 are made from metal and the seal 50 is made from rubber, the anti-extrusion washer 60 is advantageously made from PTFE (polytetrafluoroethylene).

Figure 3:
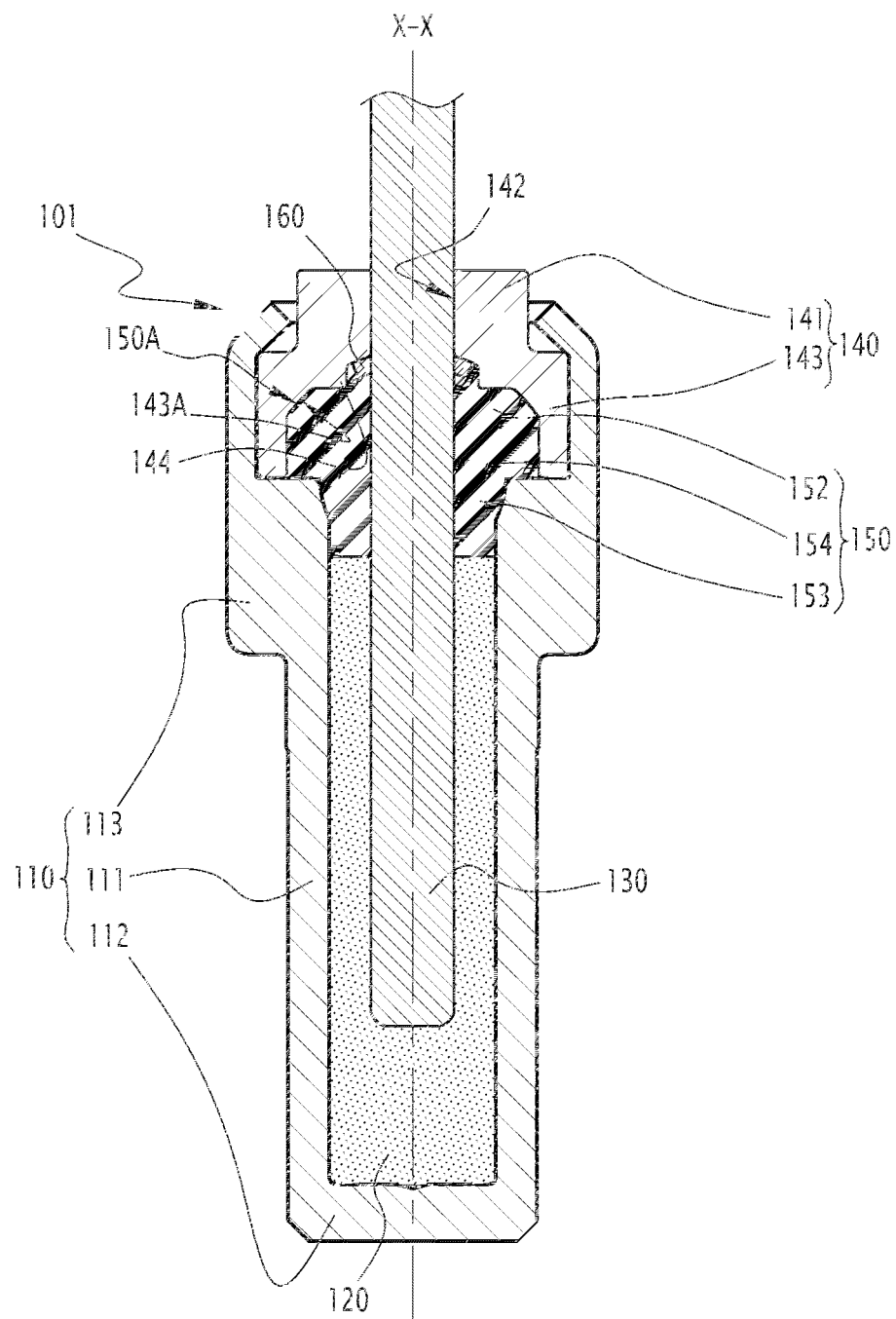
FIGS. 3 and 4 are views similar to FIGS. 1 and 2, respectively, illustrating a first embodiment of a thermostatic element according to the invention.
Figure 4:
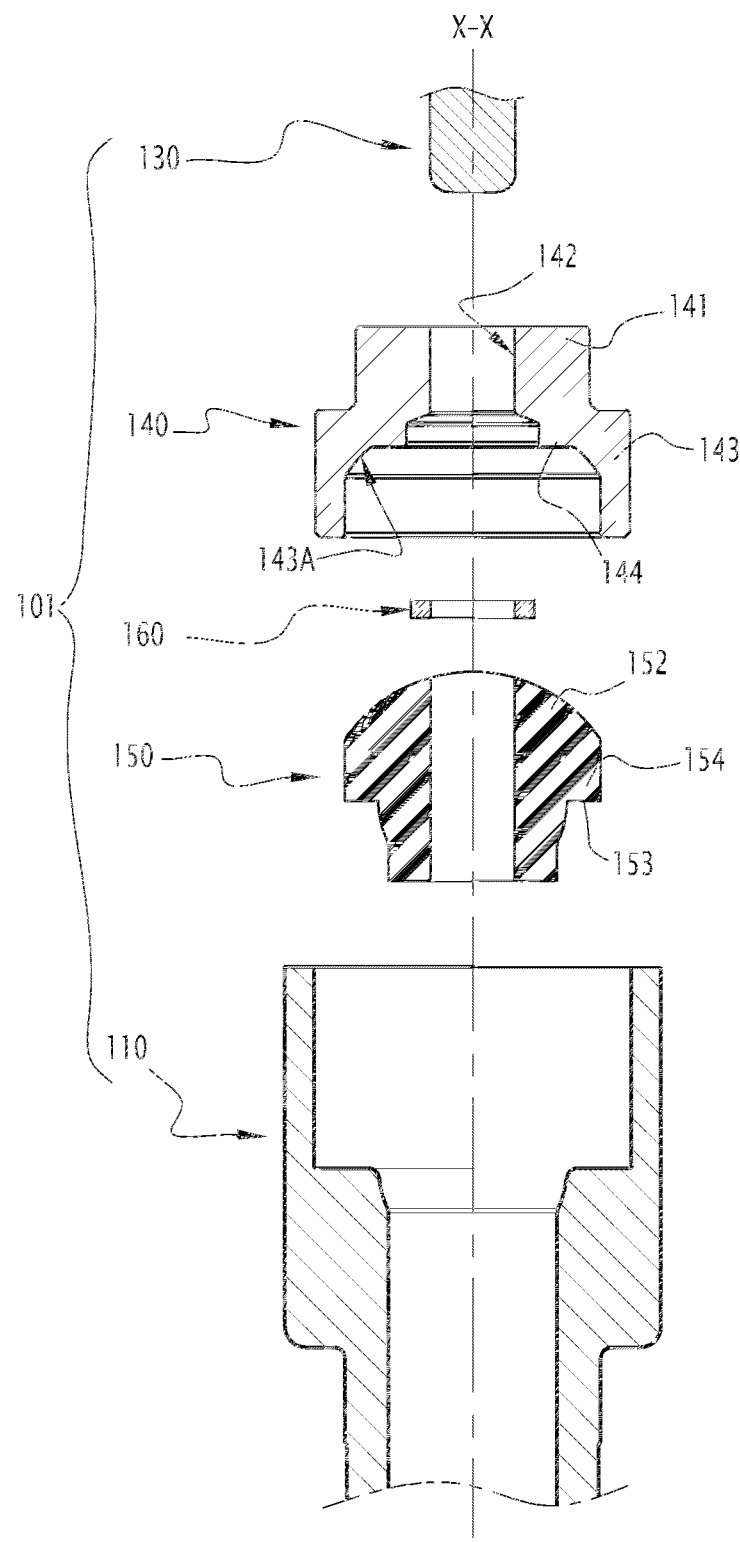

FIGS. 3 and 4 show a thermostatic element 101 that includes a cup 110, a thermally expandable material 120, a piston 130, a seal 150 and an anti-extrusion washer 160, which are respectively identical, both functionally and structurally, to the cup 10, the thermally expandable material 20, the piston 30, the seal 50 and the washer 60 of the thermostatic element 1. In particular, the cup 110 comprises a barrel 111, a bottom wall 112 and a collar 113, which are centered on an axis X-X and which are respectively identical to the barrel 11, the bottom wall 12, and the collar 13 of the cup 10. Likewise, the seal 150 is made from an upper part 152, a lower part 153 and an intermediate part 154, which are respectively identical to the upper 52, lower 53 and intermediate 54 parts of the seal 50.

The thermostatic element 101 also includes a guide 140, which includes both an upper plate 141, identical to the plate 41 of the guide 40, in particular while being inwardly provided with a bore 142 identical to the bore 42, and a collar 143, which is identical to the collar 43, with the sole difference that its bearing surface 143A, which is functionally similar to the bearing surface 43A of the guide 40, bears an additional string 144 that protrudes downward from the surface 143A. Thus, in the example embodiment considered in FIGS. 3 and 4, the bearing surface 143A, as described above in light of FIGS. 1 and 2, assumes a spherical shape of revolution around the axis X-X, while the string 144 runs over that spherical bearing surface 143A while being centered on the axis X-X and while being integral with that bearing surface.

The shape of the string 144 described just above is not limiting on the embodiment of the invention illustrated by FIGS. 3 and 4, inasmuch as that string 144 can, as an alternative that is not illustrated, be replaced by any form of raised portion protruding from the surface 143A: in the assembled state of the thermostatic element 101, this string 144 or, more generally, the aforementioned protruding raised portion locally crushes the flexible material making up the upper part 152 of the seal 150, while locally increasing the compression of the material by the guide 140, compared to the compression of the rest of that material by the bearing surface 143A. When the upper part 152 of the seal 150 is considered globally, it is understood that its volume compression rate, i.e., the ratio between its volume in a compressed state of the material making up that upper part 152 when the thermostatic element 101 is assembled and the volume of the same material in the free state of the seal 150, in particular before assembly with the rest of the thermostatic element 101, has a value strictly greater than the value of the compression rate of the upper part 52 of the seal 50 of the thermostatic element 1 in the assembled state thereof. In other words, in light of the identity between the thermostatic element 1 and the thermostatic element 101 except regarding the additional presence of the string 144 or, more generally, the aforementioned protruding raised part, the upper part 152 of the seal 150 is compressed more, under the action of that seal or that protruding raised portion, than the upper part 52 of the seal 50, which amounts to saying that that string or, more generally, that protruding raised portion makes it possible to over-compress the top part 152 around the piston 130. The sealing of that piston with respect to the outside of the thermostatic element 101 is strengthened as a result.

Figure 5:
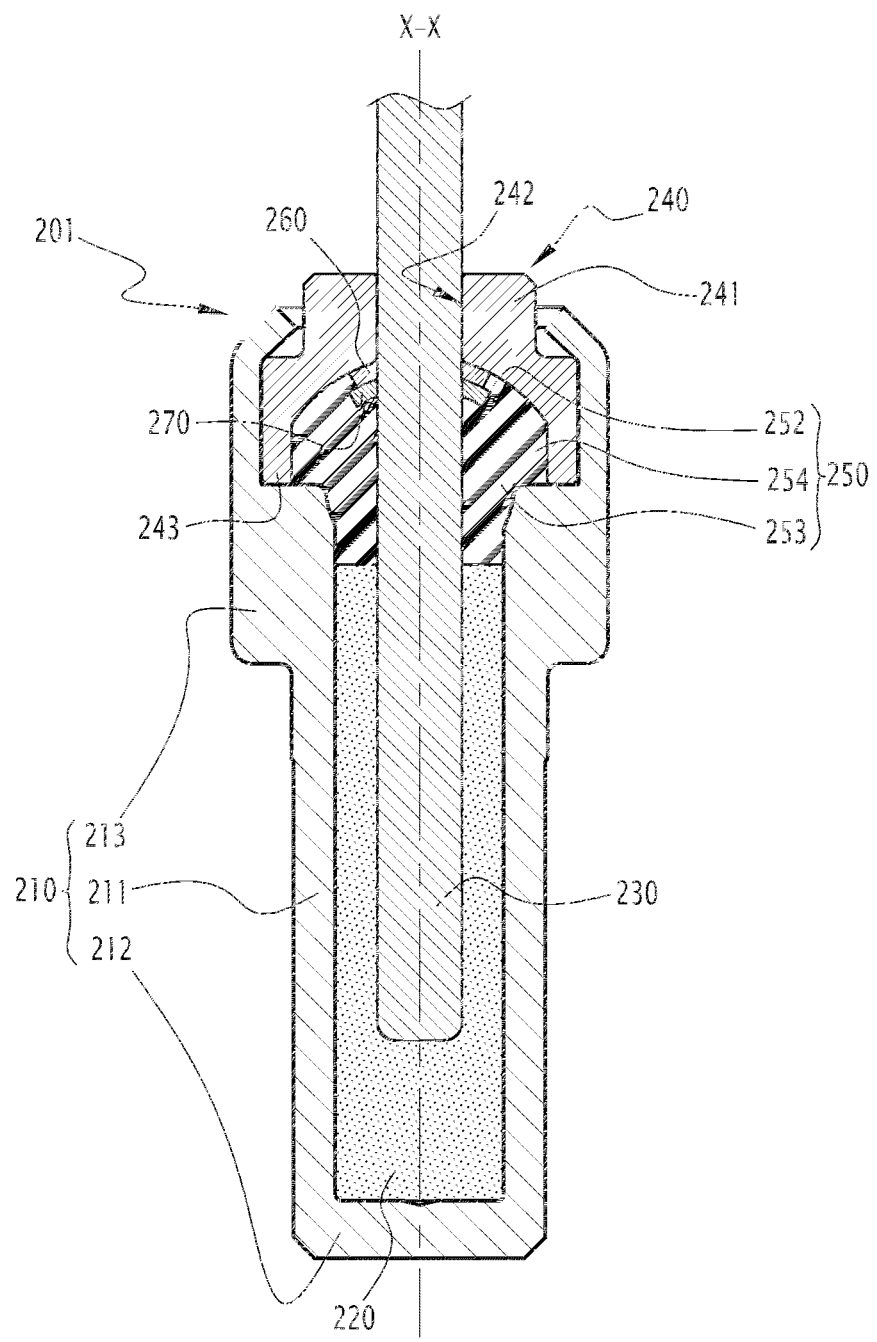
FIGS. 5 and 6 are views similar to FIGS. 1 and 2, respectively, illustrating a second embodiment of a thermostatic element according to the invention.
Figure 6:
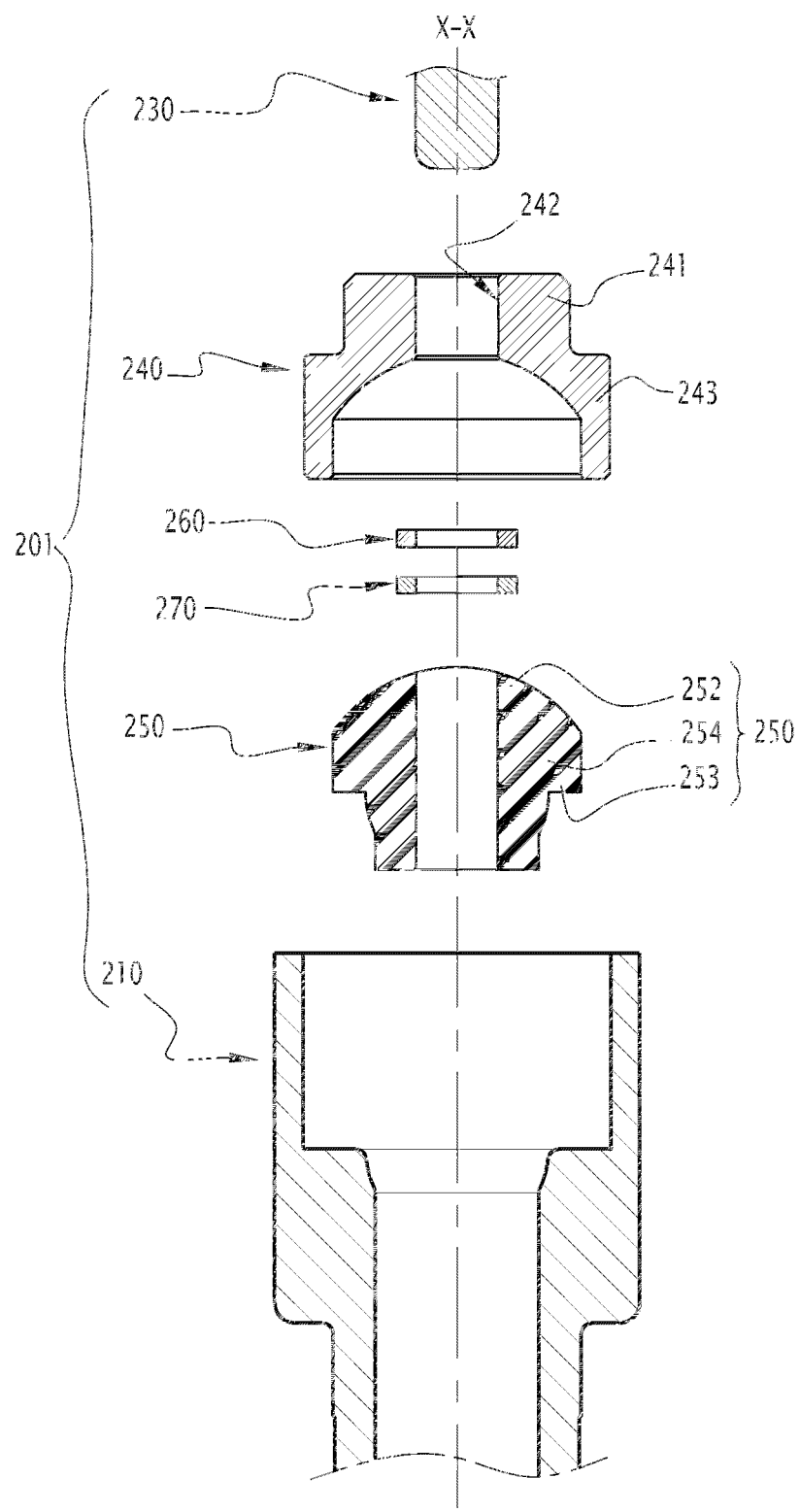

FIGS. 5 and 6 show a thermostatic element 201 that includes a cup 210, a thermally expandable material 220, a piston 230, a guide 240, a seal 250 and an anti-extrusion washer 260, which are respectively identical, both functionally and structurally, to the cup 10, the thermally expandable material 20, the piston 30, the guide 40, the seal 50 and the washer 60 of the thermostatic element 1. In particular, the cup 210 comprises a barrel 211, a bottom wall 212 and a collar 213, which are centered on axis X-X and which are respectively identical to the barrel 11, the wall 12, and the collar 13 of the cup 10. Likewise, the guide 240 includes an upper plate 241, a central bore 242 and a lower collar 243, which are respectively identical to the plate 41, the bore 42 and the collar 43 of the guide 40. Additionally, the seal 250 includes an upper part 252, a lower part 253 and an intermediate part 254, which are respectively identical to the upper 52, lower 53 and intermediate 54 parts of the seal 50.

The thermostatic element 201 differs from the thermostatic element 1 through the additional presence of a washer 270, which is separate from the anti-extrusion washer 260 and which, advantageously, as in the example embodiment considered in FIGS. 5 and 6, is individually identical to that anti-extrusion washer 260. In the assembled state of the thermostatic element 201, the additional washer 270 is mounted coaxially around the piston and is axially interposed between the anti-extrusion washer 260 and the upper part 252 of the seal 250. As an alternative that is not shown, the position of the additional washer 270 may be provided on the other axial side of the anti-extrusion washer 260, which amounts to saying that, in that case, the additional washer is axially interposed between the guide 240 and the anti-extrusion washer 260.

Irrespective of the axial side of the anti-extrusion washer 260 where the additional washer 270 is provided, it will be understood that the presence of the latter reduces the space available for the upper part 252 of the seal 250 during the compressed mounting of that seal within the thermostatic element 201: in other words, the presence of the additional washer 270 increases the value of the volume compression rate of the material making up the top part 252 of the seal 250, compared to the value of the compression rate associated with the top part 52 of the seal 50 of the thermostatic element 1 in the assembled state thereof. This results in over-compression of the upper part 252 of the seal 250 around the piston 230, thereby reinforcing the sealing of the thermostatic element 201 with respect to a liquid outside the thermostatic element.

As an alternative that is not shown, two, or even more additional washers 270 are provided.

Figure 7:
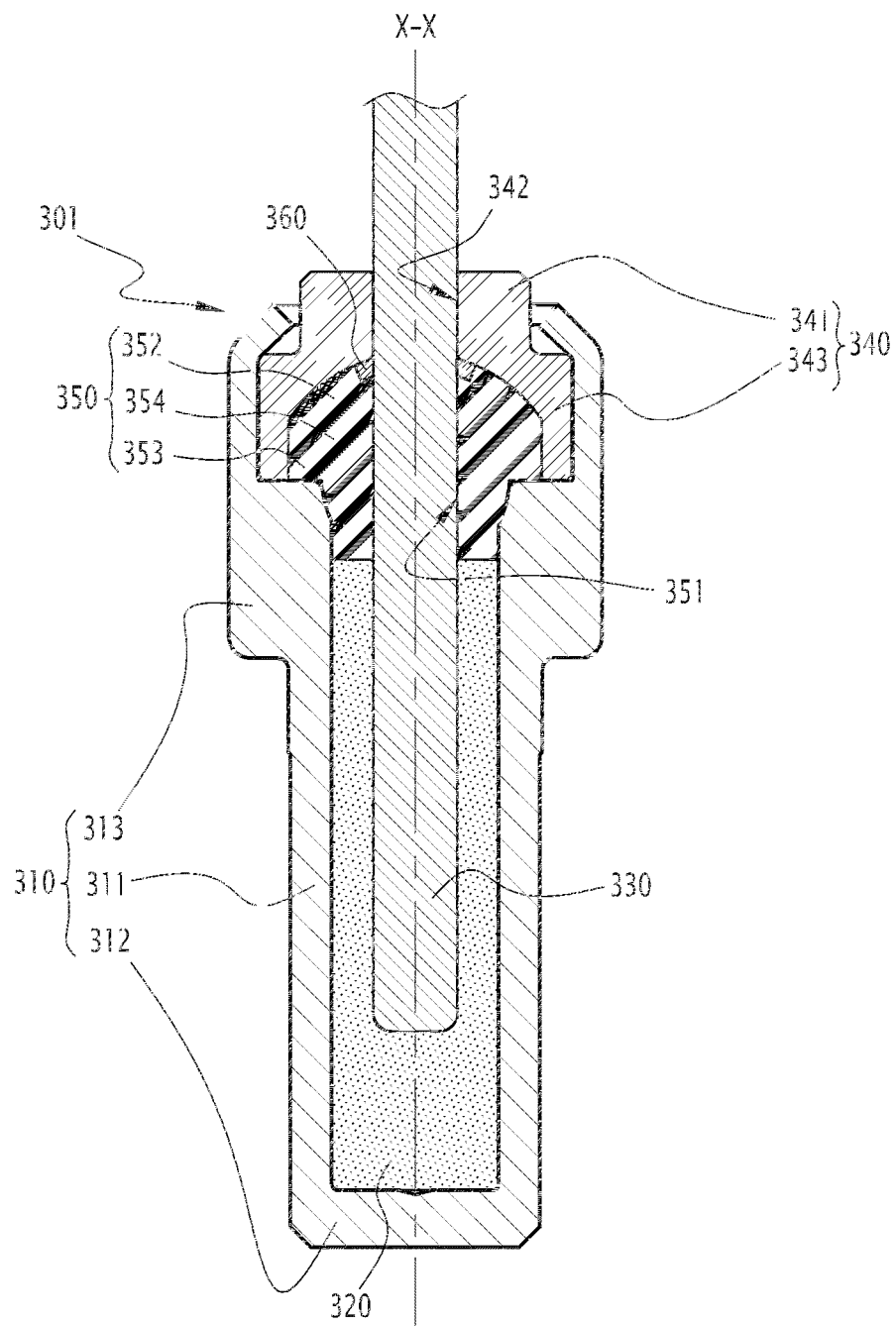
FIGS. 7 and 8 are views similar to FIGS. 1 and 2, respectively, illustrating a third embodiment of a thermostatic element according to the invention.
Figure 8:
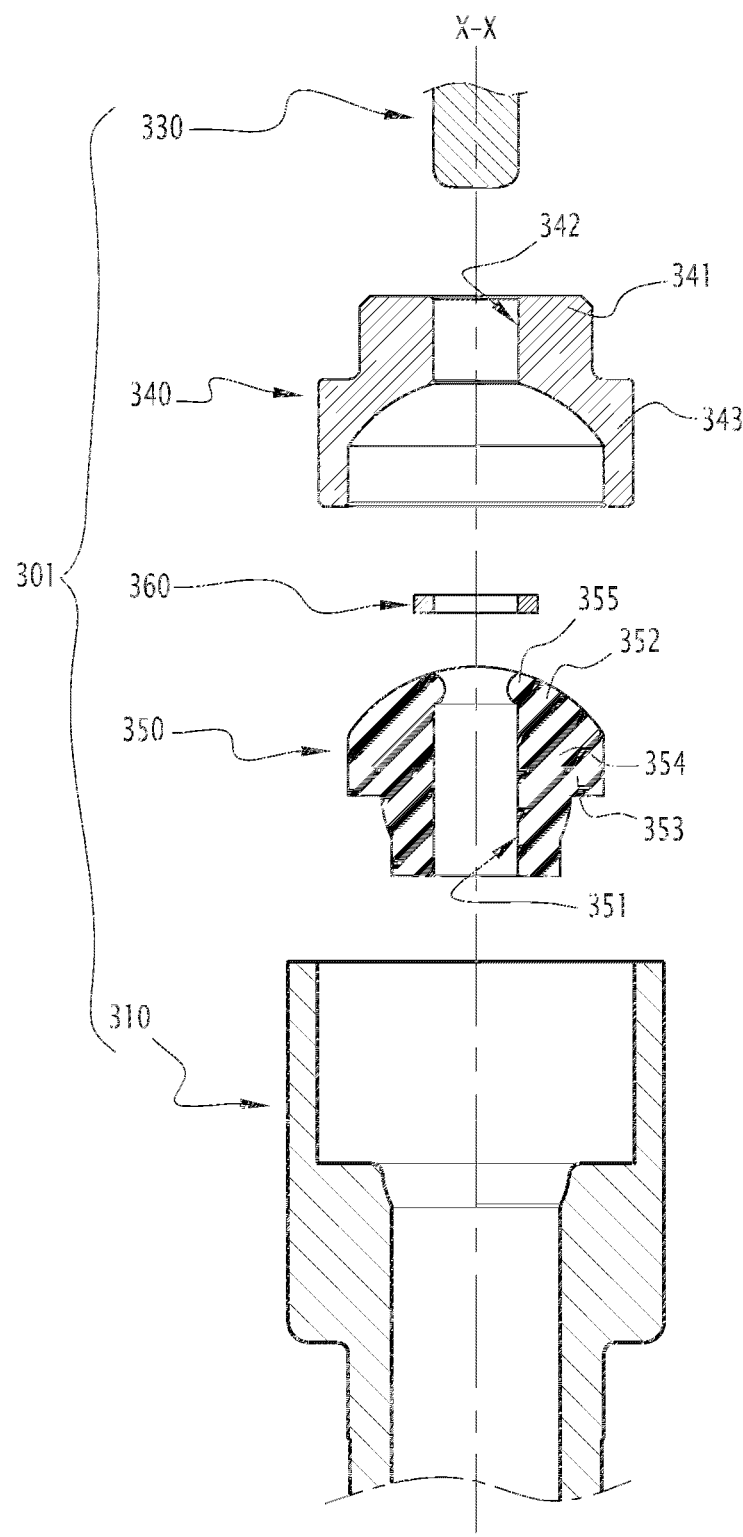

FIGS. 7 and 8 show a thermostatic element 301 that includes a cup 310, a thermally expandable material 320, a piston 330, a guide 340 and an anti-extrusion washer 360, which are respectively identical, both functionally and structurally, to the cup 10, the thermally expandable material 20, the piston 30, the guide 40 and the washer 60 of the thermostatic element 1. In particular, the cup 310 comprises a barrel 311, a bottom wall 312 and a collar 313, which are centered on an axis X-X and which are respectively identical to the barrel 11, the bottom wall 12 and the collar 13 of the cup 10. Likewise, the guide 340 includes an upper plate 341, a central bore 342 and a lower collar 343, which are respectively identical to the plate 41, the bore 42 and the collar 43 of the guide 40.

The thermostatic element 301 also includes an annular sealing gasket 350 that is formed by an upper part 352, a lower part 353 and an intermediate part 354, the lower 353 and intermediate 354 parts respectively being identical to the lower 53 and intermediate 54 parts of the seal 50, while the upper part 352 is identical to the upper part 52 of the seal 50 with the sole difference that that upper part 352 of the seal 350 bears an additional bead 355. As clearly shown in FIG. 8, this bead 355 is arranged in the upward opening of the through hole 351 of the seal 350, which is functionally similar to the through hole 51 of the seal 50, i.e., the bead 355 protrudes radially inward from the wall of the through hole 351, delimited by the upper part 352 of the seal 350.

During the assembly of the thermostatic element 301, the bead 355 interferes radially with the piston 330 received in the hole 351, until it is canceled out by the radial crushing under the action of the piston 330, as shown in FIG. 7. It will be understood that this cancellation of the bead 355 results in increasing the quantity of the flexible material making up the seal 350 in the available free space, within the thermostatic element 301, for the upper part 352 of the seal 350, whereas the aforementioned free space is unchanged compared to the case of the thermostatic element 1. In other words, the volume compression rate of the upper part 352 of the seal 350 is, under the effect of the cancellation of the additional bead 355 by the piston 330 in place in the through hole 351, increased relative to the compression rate of the upper part 52 of the seal 50 in the assembled state of the thermostatic element 1. This upper part 352 of the seal 350 is thus over-compressed as a result around the piston 330, then reinforcing the sealing of the thermostatic element 301 with respect to the outside.

Various arrangements and alternatives to the thermostatic elements 101, 201 and 301 described thus far can also be considered. For example:

the three embodiments, respectively associated with the thermostatic elements 101, 201 and 301, can be combined two by two, or combined all three, further accentuating the over-compression of the upper part of the seal of the thermostatic element thus obtained by combination, around the piston of that thermostatic element; and/or optionally, the piston 130, 230 or 330 may be inwardly provided with an electric heating resistance, designed to heat the thermally expandable material 120, 220 or 320 through the inside, electricity supply conductors of that heating resistance extending from the end of the piston opposite that submerged in the cup 110, 210 or 310.

The invention claimed is:

1. A thermostatic element, comprising:
a rigid cup, which contains a thermally expandable material,
a rigid piston, which is translatable, along its axis, relative to the cup, under the action of the thermally expandable material during an expansion of that material,
a rigid guide for guiding the translation of the piston, said guide being rigidly secured to the cup,
a flexible seal for sealing the thermally expandable material with respect to the outside of the thermostatic element, said flexible seal having a globally annular shape that is centered on the axis and that is axially crossed all the way through by the piston, said flexible seal comprising first and second opposite axial parts, against which the guide and the cup are respectively pressed substantially antagonistically so as to compress the seal around the piston, and
an anti-extrusion washer, which is mounted coaxially around the piston and is axially interposed between the guide and the first part of the seal,
wherein a raised portion protruding from a surface of the guide is pressed against the first part of the seal so as to over-compress the first part of the seal around the piston, the raised portion being suitable for making the compression rate of the first part of the seal equal to a value strictly greater than its value associated with an operational thermostatic element formed by the cup, the piston, the guide, the seal and the anti-extrusion washer assembled to each other without the raised portion.

2. The thermostatic element according to claim 1, wherein said raised portion is integral with the guide.

3. The thermostatic element according to claim 1, wherein said surface of the guide is substantially spherical and of revolution around the axis, and wherein said raised portion forms a string centered on the axis.

4. The thermostatic element according to claim 1, wherein the thermostatic element further comprises at least one additional washer in addition to the anti-extrusion washer, which is mounted coaxially around the piston and is axially interposed either between the guide and the anti-extrusion washer, or between the anti-extrusion washer and the first part of the seal, so as to over-compress the first part of the seal around the piston.

5. The thermostatic element according to claim 4, wherein a bead, which is provided radially protruding inward from the wall of a through hole, centered on the axis and delimited by the seal to receive the piston, is canceled out by radial crushing when the piston is received in the through hole in the assembled state of the thermostatic element so as to over-compress the first part of the seal around the piston.

6. The thermostatic element according to claim 1, wherein a bead, which is provided radially protruding inward from the wall of a through hole, centered on the axis and delimited by the seal to receive the piston, is canceled out by radial crushing when the piston is received in the through hole in the assembled state of the thermostatic element so as to over-compress the first part of the seal around the piston.

7. The thermostatic element according to claim 1, wherein the anti-extrusion washer has a rigidity greater than that of the seal, but less than that of the cup, the piston and the guide.

8. The thermostatic element according to claim 7, wherein the cup, the piston and the guide are made from metal materials, the seal is made from rubber, and the anti-extrusion washer is made from PTFE.

9. A thermostatic element, comprising:
a rigid cup, which contains a thermally expandable material,
a rigid piston, which is translatable, along its axis, relative to the cup, under the action of the thermally expandable material during an expansion of that material,
a rigid guide for guiding the translation of the piston, said guide being rigidly secured to the cup,
a flexible seal for sealing the thermally expandable material with respect to the outside of the thermostatic element, said flexible seal having a globally annular shape that is centered on the axis and that is axially crossed all the way through by the piston, said flexible seal comprising first and second opposite axial parts, against which the guide and the cup are respectively pressed substantially antagonistically so as to compress the seal around the piston, an anti-extrusion washer, which is mounted coaxially around the piston and is axially interposed between the guide and the first part of the seal, and at least one additional washer in addition to the anti-extrusion washer, which is mounted coaxially around the piston and which is axially interposed either between the guide and the anti-extrusion washer, or between the anti-extrusion washer and the first part of the seal, so as to over-compress the first part of the seal around the piston, said at least one additional washer being suitable for making the compression rate of the first part of the seal equal to a value strictly greater than its value associated with an operational thermostatic element formed by the cup, the piston, the guide, the seal and the anti-extrusion washer assembled to each other without the at least one additional washer.

10. The thermostatic element according to claim 9, wherein the at least one additional washer is individually identical to the anti-extrusion washer.

11. The thermostatic element according to claim 9, wherein a raised portion protruding from a surface of the guide is pressed against the first part of the seal so as to over-compress the first part of the seal around the piston.

12. The thermostatic element according to claim 11, wherein a bead, which is provided radially protruding inward from the wall of a through hole, centered on the axis and delimited by the seal to receive the piston, is canceled out by radial crushing when the piston is received in the through hole in the assembled state of the thermostatic element so as to over-compress the first part of the seal around the piston.

13. The thermostatic element according to claim 9, wherein a bead, which is provided radially protruding inward from the wall of a through hole, centered on the axis and delimited by the seal to receive the piston, is canceled out by radial crushing when the piston is received in the through hole in the assembled state of the thermostatic element so as to over-compress the first part of the seal around the piston.

14. The thermostatic element according to claim 9, wherein the anti-extrusion washer has a rigidity greater than that of the seal, but less than that of the cup, the piston and the guide.

15. The thermostatic element according to claim 14, wherein the cup, the piston and the guide are made from metal materials, the seal is made from rubber, and the anti-extrusion washer is made from PTFE.

16. A thermostatic element, comprising:
a rigid cup, which contains a thermally expandable material,
a rigid piston, which is translatable, along its axis, relative to the cup, under the action of the thermally expandable material during an expansion of that material,
a rigid guide for guiding the translation of the piston, said guide being rigidly secured to the cup,
a flexible seal for sealing the thermally expandable material with respect to the outside of the thermostatic element, said flexible seal having a globally annular shape that is centered on the axis and that is axially crossed all the way through by the piston, said flexible seal comprising first and second opposite axial parts, against which the guide and the cup are respectively pressed substantially antagonistically so as to compress the seal around the piston, and
an anti-extrusion washer, which is mounted coaxially around the piston and is axially interposed between the guide and the first part of the seal,
wherein a bead, which is provided radially protruding inward from the wall of a through hole, centered on the axis and delimited by the seal to receive the piston, is canceled out by radial crushing when the piston is received in the through hole in the assembled state of the thermostatic element so as to over-compress the first part of the seal around the piston, the bead being suitable for making the compression rate of the first part of the seal equal to a value strictly greater than its value associated with an operational thermostatic element formed by the cup, the piston, the guide, the seal and the anti-extrusion washer assembled to each other without the bead.

17. The thermostatic element according to claim 16, wherein a raised portion protruding from a surface of the guide is pressed against the first part of the seal so as to over-compress the first part of the seal around the piston.

18. The thermostatic element according to claim 17, wherein the thermostatic element further comprises at least one additional washer in addition to the anti-extrusion washer, which is mounted coaxially around the piston and which is axially interposed either between the guide and the anti-extrusion washer, or between the anti-extrusion washer and the first part of the seal, so as to over-compress the first part of the seal around the piston.

19. The thermostatic element according to claim 16, wherein the thermostatic element further comprises at least one additional washer in addition to the anti-extrusion washer, which is mounted coaxially around the piston and which is axially interposed either between the guide and the anti-extrusion washer, or between the anti-extrusion washer and the first part of the seal, so as to over-compress the first part of the seal around the piston.

20. The thermostatic element according to claim 16, wherein the bead is integral with the first part of the seal.

\* \* \* \* \*